Nov. 8, 1949  F. B. NEWELL  2,487,266
PNEUMATIC CONTROLLER
Filed Nov. 29, 1946  2 Sheets-Sheet 1

INVENTOR.
Floyd B. Newell
BY D. Clyde Jones
his Attorney

Nov. 8, 1949         F. B. NEWELL         2,487,266
                  PNEUMATIC CONTROLLER
Filed Nov. 29, 1946                    2 Sheets-Sheet 2
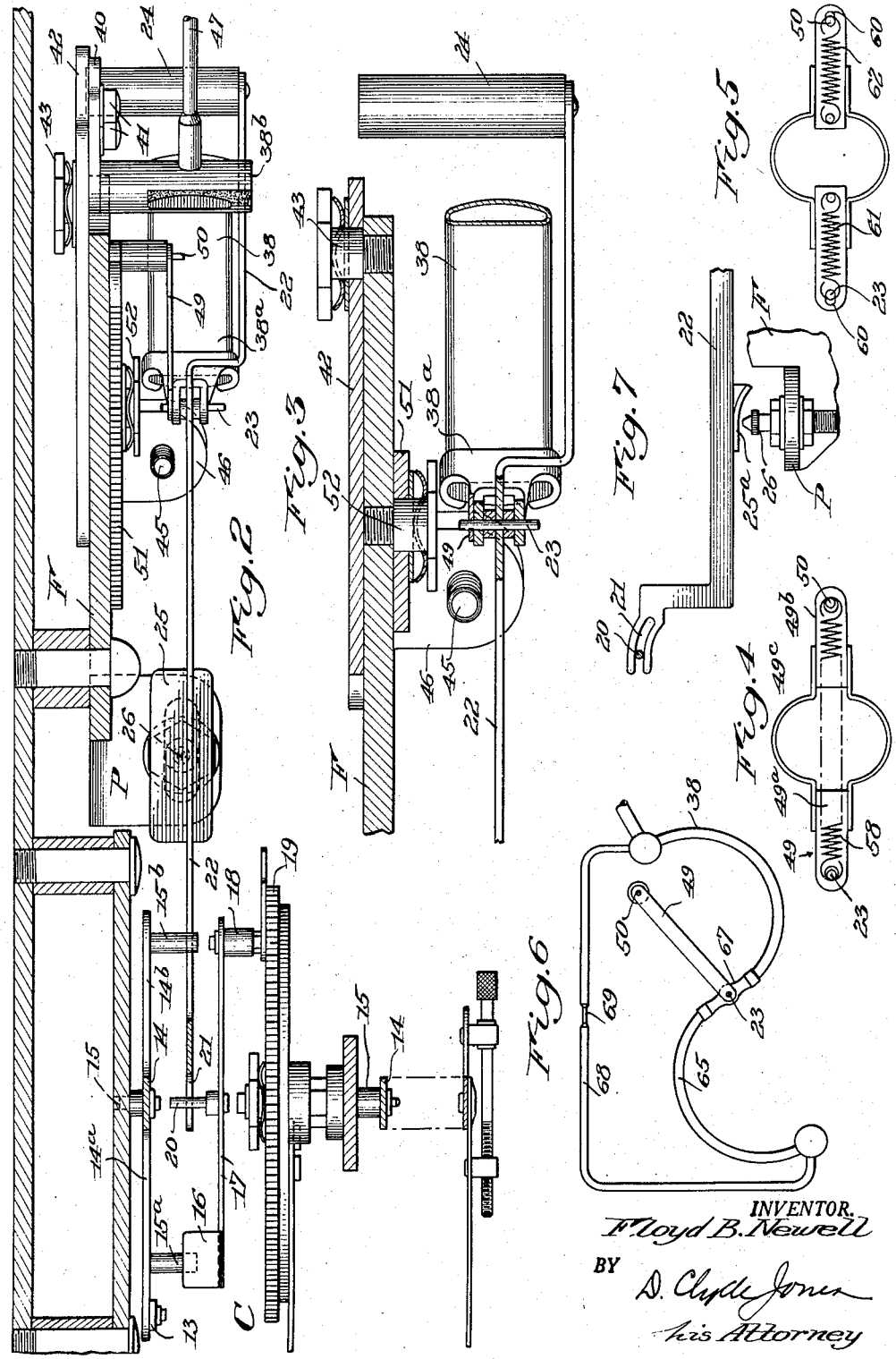
INVENTOR.
Floyd B. Newell
BY
D. Clyde Jones
his Attorney Patented Nov. 8, 1949

2,487,266

UNITED STATES PATENT OFFICE 2,487,266

PNEUMATIC CONTROLLER

Floyd B. Newell, Rochester, N. Y., assignor to Taylor Instrument Companies, Rochester, N. Y., a corporation of New York Application November 29, 1946, Serial No. 713,169

10 Claims. (Cl. 236—82)

This invention relates to pneumatic control systems, and more particularly to systems for maintaining a condition of a process (such as temperature, pressure or various other variables) at or close to a predetermined constant value even though there are changes or fluctuations in the load, that is, changes in the amount of some quantity such as electrical energy, steam, air pressure, or the like, required to maintain the condition at the desired value.

In such systems, the ratio between the correction effected by the controller and the deviation of the condition from the desired value, is commonly referred to as the sensitivity of the controller. In any controller and process combination, it is usually desirable to have the sensitivity as high as possible without the possibility of "hunting" action by the controller. Since such controllers are used in connection with a wide variety of processes, it is essential that the sensitivity of any controller be easily adjustable. In the present type of controller, the range of sensitivities is obtained by pneumatic sensitivity reduction in what would otherwise be a high sensitivity controller.

The main feature of the invention relates to a controller of the type, just referred to, which is relatively simple to make, which results in a reduction in manufacturing costs and which will be relatively easy to adjust in the field by a user of limited experience.

Other features and advantages of the invention will appear from the detailed description and claims when taken with the drawings in which:

Fig. 2 is a section taken substantially on the line 2—2 of Fig. 1;

Fig. 3 is a section also taken substantially on the line 3—3 of Fig. 1;

Fig. 4 is a detail view of the link used in the sensitivity reducing mechanism of the controller;

Fig. 5 illustrates a modified form of link;

Fig. 6 is a diagrammatic showing of an arrangement by which the controller of Fig. 1 can be modified to include reset action; and Fig. 7 illustrates a modified baffle lever and a modified baffle carried thereby, which can replace the corresponding parts in Fig. 1.

Figure 1:
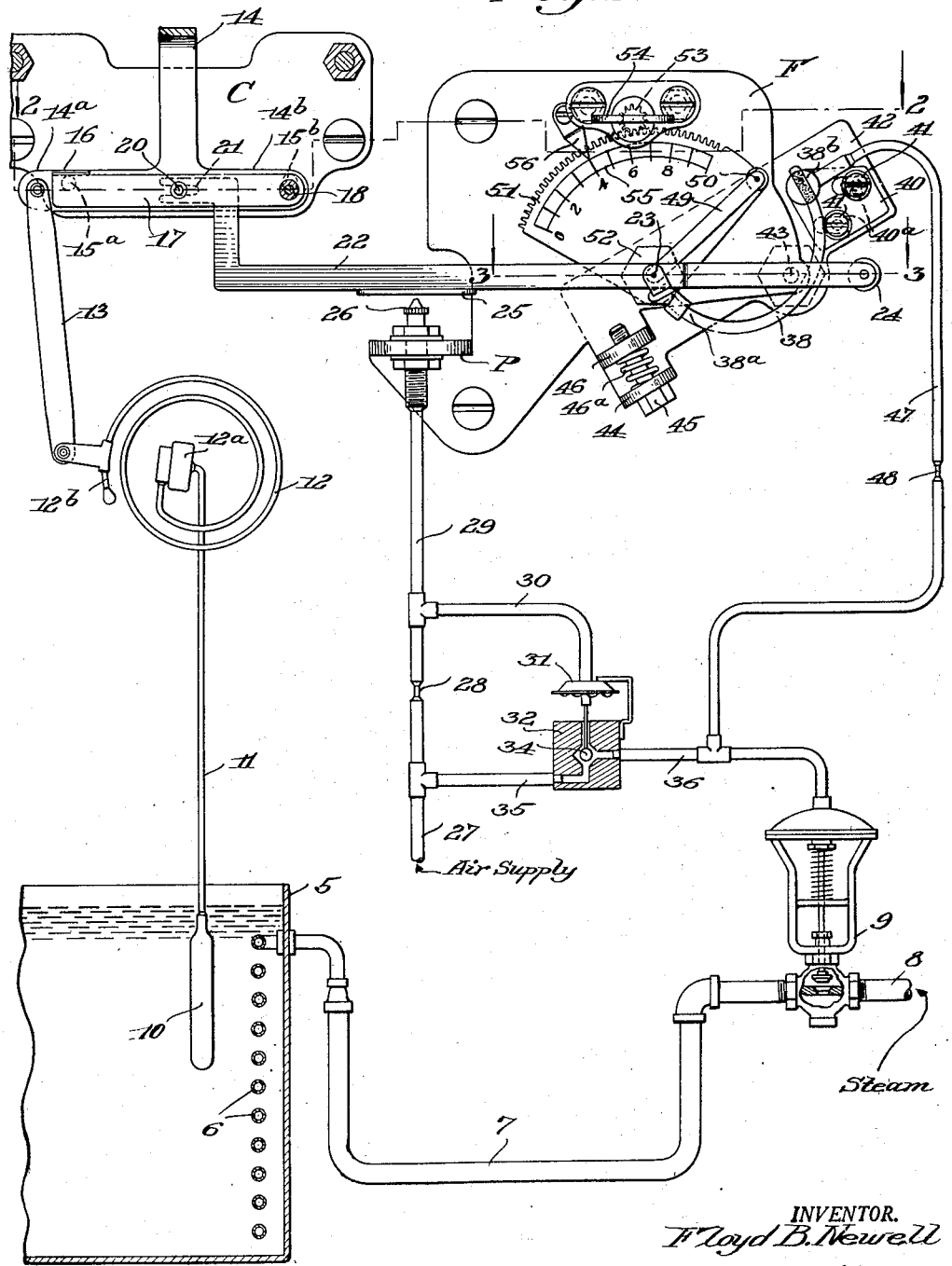
Fig. 1 is a partially diagrammatic disclosure of a temperature control system in which the essential parts of the controller are shown in front elevation.

This invention will be described as it applies to a pneumatically controlled temperature system in which the desired value is temperature and the quantity added is a heating fluid the amount of which is controlled by a pneumatically operated valve. Although this one particular application will be described in detail, this invention can be applied just as well to other types of systems such as pressure control systems, cooling control systems, humidity control systems, liquid level control systems, rate of flow control systems, and the like.

In the drawings, the numeral 5 designates a tank containing a liquid or the like, the temperature of which is to be maintained at a substantially constant value or set point. The tank is provided with a supply pipe 6 through which there is introduced a temperature correcting medium, such as steam, to maintain the desired temperature within the tank. The steam is supplied to pipe 6 from the steam source 8 under the control of a motor diaphragm valve 9. The motor diaphragm valve 9 operates under the control of a suitable temperature controller C to admit steam to the pipe 6 in amounts necessary to maintain the desired temperature.

The controller C includes a thermosensitive element which functions to detect deviations from the desired temperature of the liquid in the tank 5. This thermosensitive element is preferably in the form of a tube system comprising a bulb 10 which communicates through a capillary tube 11 with a Bourdon spring 12 or like pressure responsive device, the tube system being filled with a thermosensitive medium such as a liquid or a fluid. As the thermosensitive medium in the tube system expands or contracts, as the case may be, in response to a change in temperature at the bulb 10, it applies to the Bourdon spring 12 a pressure which is a function of the temperature of the liquid in the tank. The Bourdon spring has a fixed end 12a suitably mounted by means not shown on the frame forming a part of the controller. However, the other end 12b of the Bourdon spring is free to move so that when the temperature of the liquid in the tank 5 increases, the Bourdon spring will tend to uncoil whereas when the temperature in the tank drops, the Bourdon spring will tend to coil up. The free end 12b of the Bourdon spring is connected by a link 13 to a motion reversing mechanism. This mechanism includes a pen arm bracket 14 pivoted at points 15 in a suitable support, to swing about a horizontal axis. This bracket, as best illustrated in Fig. 2, is provided with two horizontally extending arms 14a and 14b, the arm 14a being provided with outwardly extending pin 15a and the arm 14b being provided with outwardly extending pin 15b. The purpose of the two pins 15a and 15b will hereinafter be set forth. For the present, it is sufficient to point out that in the illustrated adjustment of the controller the pin 15a alone is effective. In the present adjustment the pin 15a is adapted to support a lug 16 projecting from an arm 17 which extends parallel to the plane of the arms 14a and 14b of the pen arm bracket. The arm 17 is mounted to swing about the pivot 18 which in turn is mounted on the set-point adjusting gear 19. This gear is rotatable about an axis in alignment with the axis of the pen arm bracket and serves to change the set point or the control temperature, in a manner more fully disclosed in the patent to Tate et al., No. 2,361,885, granted October 31, 1944. If it is desired to change the adjustment of the controller from the so-called direct-acting type of operation, illustrated in Fig. 1, to the so-called reverse-acting type of operation, the set-point adjusting gear is rotated substantially through one-hundred-eighty degrees. This rotation of the gear positions the pivot 18 of the arm 17 at the left (Fig. 2) of the axis of the gear so that the lug 16 on the arm now engages the pin 15 on the pen arm bracket. This is more fully described in the patent to Tate et al., No. 2,361,885.

The arm 17 is provided with a projecting pin 20 which swings in an arc as the arm 17 swings when its lug 16 is raised or lowered by the pin 15a on the pen arm bracket 14 as a result of a deviation in temperature. It will be understood that when the temperature at the bulb 10 is at the set point, the arm 17 will hold the projecting pin 20 substantially in alignment with the axis of the pen arm bracket. The pin 20 is received in a slot 21 in the left hand end of the baffle lever 22. The right hand end of lever 22 is pivoted on a pin 23 of a sensitivity reducing unit to be described. The baffle lever 22 which is partially counterweighted by the weight 24, is provided at an intermediate point thereon with a baffle 25. This baffle is mounted in a position to cooperate with a nozzle 26, which normally remains fixed after it is adjusted, although it can be adjusted vertically on the supporting plate P to change the distance between its free end and the baffle. It will be understood that the range of movement of the baffle 25 with respect to the nozzle during normal operation is a matter of thousandths of an inch only. The nozzle is supplied with compressed air from a regulated source 27 through the resistance or orifice 28 and through the pipe 29. The air supplied to the nozzle escapes therethrough in amounts determined by the position of the baffle with the result that as the baffle approaches the nozzle the back pressure in the pipe 29 will increase and as the baffle moves away from the nozzle the back pressure in the pipe 29 will drop. The pipe 29 communicates through a pipe 30 with the capsular diaphragm 31 of a relay valve 32. As the back pressure increases in the pipes 29 and 30, the capsular diaphragm will move its valve element 34 to decrease the application of compressed air from the supply pipe 27 and its branch 35, to the pipe 36 leading to the diaphragm motor top of the valve 9. A decrease in the mentioned back pressure in the pipes 29 and 30 will affect the capsular diaphragm to move the valve element 34 to increase the application of compressed air to the motor top of valve 9.

It has been mentioned that the right hand end of the baffle lever 22 is pivoted on a pin 23 carried by a sensitivity reducing unit. This unit includes a pressure responsive element which may be in the form of a Bourdon spring, a bellows, a diaphragm or any other pressure responsive element. As herein illustrated, the pressure responsive element is in the form of a Bourdon spring 38.

In designing the sensitivity reducing unit it must be recognized that it is a characteristic of the motion of the tip or free end of any Bourdon spring, that the motion is along a curved path which at any particular small section of the path has a certain radius and a certain instantaneous center. As the pressure changes, the radius changes and the instantaneous center moves, but for the small motions encountered in this particular device, the center can be considered as fixed at an average position such as at a point in registry with pin 43, to be further referred to. Also the motion of the pin 23 which is carried on the free end of the Bourdon spring can be considered to be along a line perpendicular to a line connecting the center of pin 43, and the pin 23.

The Bourdon spring 38 carries pin 23 on its free end 38a and has its normally fixed end 38b secured to a plate 40. This plate has horizontal slots 40a therein to receive screws 41 engaging a bracket 42 of the instrument so that the plate and the Bourdon spring can be moved to the right or to the left, as viewed in Fig. 1. The bracket 42 in turn is pivoted on pin 43 projecting from the frame F of the instrument. The left end of the bracket is provided with an upturned flange 44 having a small aperture to receive the adjusting screw 45 which is threaded into a flange 46 on the frame. A spring 46a, interposed between the flanges 44 and 46 holds the bracket against the head of the screw. The Bourdon spring 38 at its fixed end communicates through the pipe 47 and the orifice 48 with the pipe 36 communicating with the motor top of the valve 9. Thus, the compressed air applied to the motor of the valve 9 is also applied to the interior of the Bourdon spring, the orifice 48 serving to delay slightly the application of this pressure to the Bourdon spring for the purpose of providing a derivative effect. The free end 38a of the Bourdon spring 38 which carries the pin 23, moves the right end of the baffle lever 22 to further modify the relation of the baffle 25 with respect to the nozzle 26. The effect of the free end of the Bourdon spring on the baffle lever can be adjustably modified by a link generally designated 49. One end of this link is attached to the pin 23 and the other end of the link is pivotally mounted on a projecting pin 50 secured near the edge of a sector plate 51. This sector plate which is rotatively mounted on pivot 52 in the frame, is provided with gear teeth on its periphery. These teeth are engaged by a pinion 53 rotatably mounted on the frame and operable by a manual knob 54 so that the sector which is provided with a graduated numerical scale 55 can be rotated in relation to the fixed index 56.

It has been mentioned that the fixed or input end 38b of the Bourdon spring 38 is mounted on a plate 40 which can be adjusted in two directions on the instrument frame F by moving the plate horizontally along screws 41 and by rotating the bracket 42 through adjusting screw 45. These adjustments are jointly, for the purpose of locating the take-off pin 23 at a given position when the Bourdon spring 38 is supplied with any pressure within its range. That given position is the center 52 about which the gear 51 is rotated by pinion 53. The horizontal adjustment is parallel to the line through the axes of the pin 23 and pivot 43. This is for the purpose of moving the path of motion of the pin 23 (as pressure is applied to Bourdon spring 38) so that it passes through the desired center point which is the axis 52 of the gear 51. The other adjustment of the fixed end of the Bourdon spring which is about the center 43 can be used to locate the pin 23 concentric with the axis 52 of the gear 51 when there is any particular pressure in the spring, if the first or horizontal adjustment has been properly made.

The pin 50 is located at such a radius on the gear 51 that by rotating this gear, the pin 50 can be located in alignment with the pin 43. When the gear is in this position, the rigid link 49 which connects point 50 and the take-off pin 23, will have no appreciable effect on the motion of the take-off pin 23 of the Bourdon spring 38, since the natural free movement of this spring is approximately about the point 43. When the pin 50 is in alignment with the pin 43, the instrument is functioning in low sensitivity, that is, the output pressure change (the change in pressure on the diaphragm of the motor valve 9) per unit of movement of the Bourdon spring 12 is a minimum.

When the link 49 in the sensitivity reducing mechanism, is rotated through 90 degrees from its horizontal position wherein pin 50 is over the bearing axis 43, to its vertical position (Fig. 1) then the link 49 is in line with the natural motion of the Bourdon spring, thus restraining the spring from moving at all when pressure is applied thereto. The instrument is then in high sensitivity, that is, the output pressure change per unit of movement of the Bourdon spring 12 is a maximum. The actual output pressure change, however, is dependent on the lever ratios between the Bourdon spring 12, and the baffle, as well as on the nozzle characteristics, and the input to output ratio of the relay valve 34.

When the link 49 is in a position intermediate of the horizontal and vertical extreme positions, mentioned above, the sensitivity of the controller will be between the low and high extremes, for the sensitivity is a function of the position of the link. This will be understood since the link 49 restrains the motion of the Bourdon spring 38, to a direction perpendicular to the link and the force constant of the Bourdon spring is lowest in the natural direction of motion which is vertical. This force constant is much higher in a direction perpendicular to the natural direction of motion of the Bourdon spring (namely in a horizontal direction) and some uniform function of the angular position of the link at intermediate positions. Therefore, the Bourdon spring when forced to move in a direction other than its natural one, moves much less for each increment of pressure internally applied thereto. This motion can be resolved into two components, one component being parallel to the baffle lever 22 and the other component being perpendicular thereto. The former motion has no effect on the baffle-nozzle distance while the latter motion does. Therefore, the sensitivity reducing action can be modified by the position of the link 49 from no restraint on the Bourdon spring 38 when the point 50 is over point 43 wherein link 49 is horizontal, to complete when link 49 is vertical with various selectable degrees of restraint as link 49 is adjusted to various intermediate portions. Therefore, the moving of the link 49 from a horizontal position to a vertical position, as the knob 54 rotates pinion 53 and in turn sector plate 51, makes possible a continuous change in sensitivity reduction from minimum to maximum. The sensitivity scale 55 and the pointer 56, indicate the sensitivity values resulting.

In the above description, it has been assumed that the link 49 is rigid and that it is mounted at each end on pins 23 and 50 which are rigid. However, if the link 49 is extensible and compressible and is turned to its vertical position, then as the pressure in the Bourdon spring 38 changes and the force on the pin 23 changes, this pin no longer remains fixed but can move an amount which depends upon the pressure change, the constants of the Bourdon spring 38 and the compressibility of the link. This motion of the link reduces the sensitivity of the unit. Thus by giving the link 49 or the pin 23 or the pin 50 some flexibility, the sensitivity of the unit when the link is vertical can be reduced without affecting the sensitivity when the link is horizontal. In this manner, the sensitivity range covered by scale 55 is much smaller and the scale is therefore more open. A convenient arrangement for providing extensibility and compressibility in the link, is illustrated in Fig. 4. In that arrangement, the link 49 comprises two flat pieces 49a and 49b which are joined together by bowed spring strips 49c and 49d, attached to their respective longitudinal edges.

Let it be assumed that the fluid in the tank 5 becomes cooled so that the temperature of the bulb 10 decreases. This causes a decrease in the pressure in spring 12 which rotates counterclockwise moving the link 13 and the pin 20 down. Thus the left end of the baffle lever 22 moves down as it rotates about the pin 23 to carry the baffle 25 closer to the nozzle 26, thus increasing the pressure in the pipes 29 and 30 as well as in the diaphragm capsule 31 of the relay valve 32. Since the relay valve illustrated is reverse acting, its valve element 34 will decrease the output pressure supplied through this relay and pipe 36 to the motor of the controller valve 9. Also, the decreased pressure in pipe 36 and its branch 37 is supplied through the orifice to the Bourdon spring 38, with the result that the free end of this spring and the pin carried thereby, are moved upward. Pin 23 moves the right end of the baffle lever 22 upward so that the baffle 25 carried thereby tends to separate from the nozzle 26. This separation results in the lowering of the nozzle back pressure, which decreases the effect of temperature changes on the nozzle pressure and therefore modifies the output pressure of relay valve 32 in line 36 and on the diaphragm of motor valve 9. As the pressure on the diaphragm of valve 9 is decreased, the valve is allowed to open due to the action of its restoring spring to supply more steam from the source 8 through the line 9 to the tank 5. This counteracts the decrease in temperature due to the load. When a different opening of the valve 9 and therefore a different pressure in the pipe 36 is required to partially compensate for a change in load, a different position of the pin 23 is necessary in order to open the nozzle 26 the required amount. The lower the sensitivity of the controller, the greater the amount of movement of the pin 23 that is required, and therefore the greater the amount by which the temperature within the tank 5 fails to return to its original value. To restore the temperature to the control point, the pin 23 in the sensitivity reducing mechanism, is moved either up or down by means of the adjusting screw 45.

In the previous description it has been assumed that there are no clearances between the pins 23 and 50 and their bearings, at each end of the link 49. Clearance accidentally or purposely introduced at one or both of these points, allows the Bourdon spring to move freely through that portion of its range, which is at the control point, as if there were no restraining link. Therefore during that interval, the sensitivity is as low as it is when the link is horizontal. In certain applications this characteristic might be desirable. However, when this type of performance is undesirable, a spring 58 (Fig. 4) is used to eliminate the lost motion in the bearings. The force exerted by the spring 58 must be slightly more than that exerted by the Bourdon spring 38 under any condition. The sensitivity reduction when the link 49 is in the vertical position, is the result then of the combined force constants of the link 49 and the spring 58.

If the link 49 of Fig. 4 is modified, as shown in Fig. 5, that is, with slots 60 in which the pins 23 and 50 slide and with two separate springs 61, 62 for eliminating the back lash, then the unit would function as described above provided the spring force of each spring 61 or 62 always exceeds that of the Bourdon spring 38. If, however, the springs 61, 62 are weaker than the Bourdon spring 38, thus permitting the pins to move in their slots 60 when the force of the Bourdon spring exceeds the initial spring force, then the unit would function in high sensitivity as determined by the angle of the link 49 for a certain range at each side of the control point and would function in low sensitivity beyond these points when the springs 61 or 62 begin to elongate.

The controller of Fig. 1, can be modified to incorporate the reset feature if a second Bourdon spring 65 (Fig. 6) is so mounted and connected to Bourdon spring 38, that the point 67 at the juncture of these Bourdon springs has no motion when equal pressures are supplied to these springs. The inlet pipes of these two Bourdon springs are connected together through the pipe 68 and restriction 69. The purpose of the Bourdon spring 65 is to reset the Bourdon spring 38 to its initial position after a certain time interval which is determined by the volume of the Bourdon spring 65, pipe 68 and any attached volumes as well as by the size of the restriction 69. The link 49 will still function as described above.

For all positions of the link 49, except when it is vertical or horizontal, there is a component of the motion of the pin 23 that is parallel to the lever 22. This motion can be used to modify the output pressure provided either the baffle 25a or the slot 21 which receives the pin 20, or both, are curved (Fig. 7) instead of extending parallel to baffle lever 22.

What I claim is:

1. In a fluid pressure operated controller for maintaining a variable condition at substantially a given value, a medium for correcting changes in that condition, means including pressure operated means for supplying said medium in amounts to correct changes in said condition, a control couple comprising a nozzle and baffle movable with respect thereto for governing the application of pressure fluid to said pressure operated means, means including a lever for effecting movement of said baffle with respect to said nozzle, means for moving one end of said lever in accordance with changes in said condition, a pressure responsive device actuated in accordance with the application of said pressure fluid, said device having its principal component of motion at right angles to the other end of said lever for effecting a reduction in the movement of the baffle with respect to the nozzle, a restraining link connected to the last-mentioned end of said lever and a pivot to which the other end of said link is connected, said pivot being adjustable to selected positions between one in which the link extends generally parallel to said lever, to a limiting position in which the link extends generally at right angles to said lever, whereby said link has a restraining action that reduces the sensitivity of the controller.

2. In a fluid pressure operated controller for maintaining a variable condition at substantially a given value, a medium for correcting changes in that condition, means including pressure operated means for supplying said medium in amounts to correct changes in said condition, a control couple comprising a nozzle and baffle movable with respect thereto for governing the application of pressure fluid to said pressure operated means, means including a lever for effecting movement of said baffle with respect to said nozzle, means for moving one end of said lever in accordance with changes in said condition, a pressure responsive device having a movable end actuated in accordance with the application of said pressure, a pivot connecting the movable end of said device to the other end of said lever, said device having its principal component of motion at right angles to said lever, a member rotatably adjustable about an axis substantially in alinement with said pivot, and a restraining link pivotally connecting the margin of the member to said pivot whereby the movement of the last-mentioned end of said lever is adjustably restrained between a given minimum amount and a given maximum amount to adjustably reduce the sensitivity of said controller.

3. In a fluid pressure operated controller for maintaining a variable condition at substantially a given value, a medium for correcting changes in that condition, means including pressure operated means for supplying said medium in amounts to correct changes in said condition, a control couple comprising a nozzle and baffle movable with respect thereto for governing the application of pressure fluid to pressure operated means, means including a lever for effecting movement of said baffle with respect to said nozzle, means for moving one end of said lever in accordance with changes in said condition, a pressure responsive device having a movable end actuated in accordance with the application of said pressure, a pivot connecting the movable end of said device to the other end of said lever, said device having its principal component of motion at right angles to said lever, a member rotatably adjustable about an axis substantially in alinement with said pivot, and a restraining link pivotally connecting the margin of the member to said pivot whereby the movement of the last-mentioned end of said lever is adjustably restrained between a given minimum amount and a given maximum amount to adjustably reduce the sensitivity of said controller, said link having a small degree of extensibility and compressibility.

4. In a fluid pressure operated controller for maintaining a variable condition at substantially a given value, a medium for correcting changes in that condition, means including pressure operated means for supplying said medium in amounts to correct changes in said condition, a control couple comprising a nozzle and baffle movable with respect thereto for governing the application of pressure fluid to said pressure operated means, means including a lever for effecting movement of said baffle with respect to said nozzle, means for moving one end of said lever in accordance with changes in said condition, a Bourdon spring having a fixed end and having a movable end actuated in accordance with the application of said pressure, a pivot connecting the movable end of said spring to the other end of said lever, said spring having its principal component of motion at right angles to said lever, a member rotatably adjustable about an axis substantially in alinement with said pivot, and a restraining link pivotally connecting the margin of the member to said pivot whereby the movement of the last-mentioned end of said lever is adjustably restrained between a given minimum amount and a given maximum amount to adjustably reduce the sensitivity of said controller.

5. In a fluid pressure operated controller for maintaining a variable condition at substantially a given value, a medium for correcting changes in that condition, means including pressure operated means for supplying said medium in amounts to correct changes in said condition, a control couple comprising a nozzle and baffle movable with respect thereto for governing the application of pressure fluid to said pressure operated means, means including a lever for effecting movement of said baffle with respect to said nozzle, means for moving one end of said lever in accordance with changes in said condition, a pressure responsive device having a movable end actuated in accordance with the application of said pressure, a pivot connecting the movable end of said device to the other end of said lever, said device having its principal component of motion at right angles to said lever, a member rotatably adjustable about an axis substantially in alinement with said pivot, a restraining link pivotally connecting the margin of the member to said pivot whereby the movement of the last-mentioned end of said lever is adjustably restrained between a given minimum amount and a given maximum amount to adjustably reduce the sensitivity of said controller, each of said connections being provided with a predetermined lost motion therein to provide a low sensitivity region at each side of said control value.

6. In a fluid pressure operated controller for maintaining a variable condition at substantially a given value, a medium for correcting changes in that condition, means including pressure operated means for supplying said medium in amounts to correct changes in said condition, a control couple comprising a nozzle and baffle movable with respect thereto for governing the application of pressure fluid to said pressure operated means, means including a lever for effecting movement of said baffle with respect to said nozzle, means for moving one end of said lever in accordance with changes in said condition, a pressure responsive device having a movable end actuated in accordance with the application of said pressure, a pivot connecting the movable end of said device to the other end of said lever, said device having its principal component of motion at right angles to said lever, a member rotatably adjustable about an axis substantially in alinement with said pivot, a second pivot engaging the margin of said member, a restraining link having a slot in each of its ends to receive the respective pivots, said link serving to adjustably restrain the movement of the last mentioned end of said lever between a given minimum amount and a given maximum amount to adjustably reduce the sensitivity of said controller, and means including an auxiliary spring for each pivot for retaining it in one end of its related slot whereby there is provided a low sensitivity region at each side of said given value.

7. In a fluid pressure operated controller for maintaining a variable condition at substantially a given value, a medium for correcting changes in that condition, means including pressure operated means for supplying said medium in amounts to correct changes in said condition, a control couple comprising a nozzle and baffle movable with respect thereto for governing the application of pressure fluid to said pressure operated means, means including a lever for effecting movement of said baffle with respect to said nozzle, means for moving one end of said lever in accordance with changes in said condition, a Bourdon spring having a fixed end and having a movable end actuated in accordance with the application of said pressure, a pivot connecting the movable end of said spring to the other end of said lever, said spring having its principal component of motion at right angles to said lever, a member rotatably adjustable about an axis substantially in alinement with said pivot, a restraining link pivotally connecting the margin of the member to said pivot whereby the movement of the last mentioned end of said lever is adjustably restrained between a given minimum amount and a given maximum amount to adjustably reduce the sensitivity of said controller, a second Bourdon spring having a fixed end and a movable end with the movable end thereof connected to the movable end of said first Bourdon spring, and means including delay means for operating said second Bourdon spring in accordance with the application of said pressure.

8. In a fluid pressure operated controller for maintaining a variable condition at substantially a given value, a medium for correcting changes in that condition, means including pressure operated means for supplying said medium in amounts to correct changes in said condition, a control couple comprising a nozzle and baffle movable with respect thereto for governing the application of pressure fluid to said pressure operated means, means including a lever for effecting movement of said baffle with respect to said nozzle, means for moving one end of said lever in accordance with changes in said condition, a Bourdon spring having a fixed end and having a movable end actuated in accordance with the application of said pressure, a pivot connecting the movable end of said spring to the other end of said lever, said spring having its principal component of motion at right angles to said lever and a minor component of motion along said lever, means including said lever for effecting further movement of said baffle with respect to said nozzle in response to said minor component of motion, a member rotatably adjustable about an axis substantially in alinement with said pivot, and a restraining link pivotally connecting the margin of the member to said pivot whereby the movement of the last mentioned end of said lever is adjustably restrained between a given minimum amount and a given maximum amount to adjustably reduce the sensitivity of said controller.

9. In a fluid pressure operated controller for maintaining a variable condition at substantially a given value, a medium for correcting changes in that condition, means including pressure operated means for supplying said medium in amounts to correct changes in said condition, a control couple comprising a nozzle and baffle movable with respect thereto for governing the application of pressure fluid to said pressure operated means, said baffle having a curved surface facing said nozzle, means including a lever for effecting movement of said baffle with respect to said nozzle, means for moving one end of said lever in accordance with changes in said condition, a Bourdon spring having a fixed end and having a movable end actuated in accordance with the application of said pressure, a pivot connecting the movable end of said spring to the other end of said lever, said spring having its principal component of motion at right angles to said lever and a minor component of motion along said lever, means including said lever for effecting further movement of said baffle with respect to said nozzle in response to said minor component of motion, a member rotatably adjustable about an axis substantially in alinement with said pivot, and a restraining link pivotally connecting the margin of the member to said pivot whereby the movement of the last mentioned end of said lever is adjustably restrained between a given minimum amount and a given maximum amount to adjustably reduce the sensitivity of said controller.

10. In a fluid pressure operated controller for maintaining a variable condition at substantially a given value, a medium for correcting changes in that condition, means including pressure operated means for supplying said medium in amounts to correct changes in said condition, a control couple comprising a nozzle and baffle movable with respect thereto for governing the application of pressure fluid to said pressure operated means, means including a lever for effecting movement of said baffle with respect to said nozzle, means including a pivot for moving one end of said lever in accordance with changes in said condition, a Bourdon spring having a fixed end and having a movable end actuated in accordance with the application of said pressure, a pivot connecting the movable end of said spring to the other end of said lever, said spring having its principal component of motion at right angles to said lever and a minor component of motion along said lever, means including one of said pivots and a slot cooperating therewith, in one end of said lever and extending at an acute angle to the principal axis of said lever, a member rotatably adjustable about an axis substantially in alinement with said pivot, and a restraining link pivotally connecting the margin of the member to said pivot whereby the movement of the last mentioned end of said lever is adjustably restrained between a given minimum amount and a given maximum amount to adjustably reduce the sensitivity of said controller.

FLOYD B. NEWELL.

REFERENCES CITED

The following references are of record in the file of this patent:

UNITED STATES PATENTS

| Number | Name | Date |
| --- | --- | --- |
| 2,062,437 | Abbott | Dec. 1, 1936 |
| 2,124,946 | Harrison | July 26, 1938 |
| 2,125,109 | Harrison | July 26, 1938 |
| 2,141,464 | Gorrie | Dec. 27, 1938 |
| 2,176,603 | Belaef | Oct. 17, 1939 |
| 2,277,131 | Moore | Mar. 24, 1942 |
| 2,380,858 | McMahon | July 31, 1945 |
| 2,427,235 | Smoot | Sept. 9, 1947 |